Jan. 8, 1963     H. I. BOSMA     3,072,373
SILO BLOWER PIPE ATTACHMENT
Filed May 2, 1960
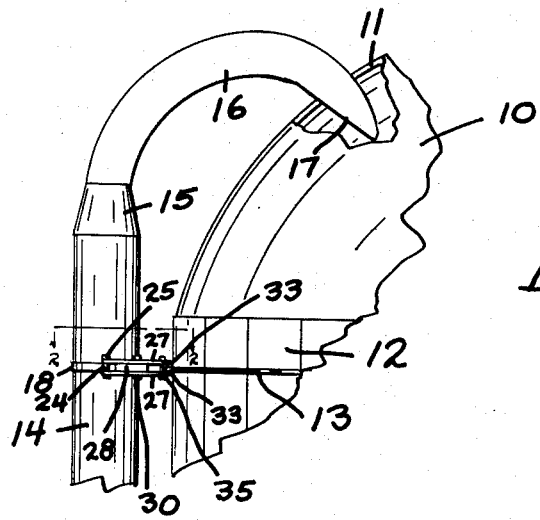
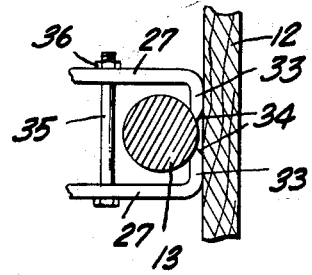
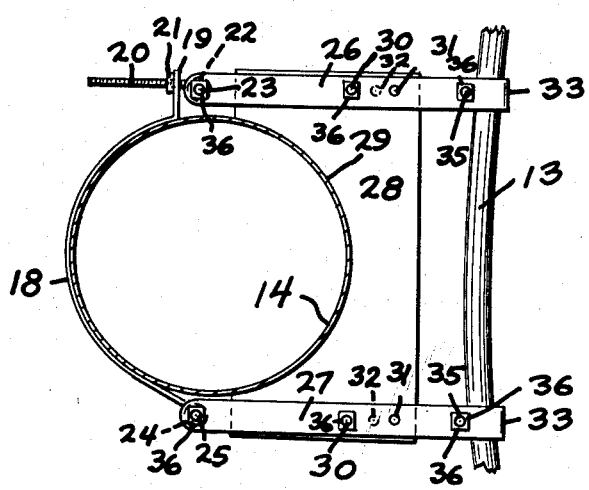
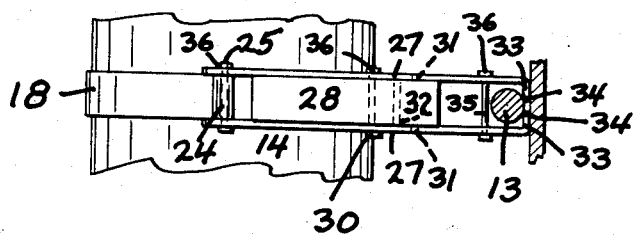
INVENTOR.
Harry I. Bosma
BY Sam J. Slotky
ATTORNEY

United States Patent Office 3,072,373
Patented Jan. 8, 1963

3,072,373
SILO BLOWER PIPE ATTACHMENT
Harry I. Bosma, Hospers, Iowa
Filed May 2, 1960, Ser. No. 26,059
2 Claims. (Cl. 248—74)

My invention relates to a silo blower pipe attachment.

An object of my invention is to provide a type of clamp and securing means whereby the upper end of a silo blower pipe can be firmly and efficiently secured to the upper circular retaining band of the silo.

A further object of my invention is to provide adjustable means whereby the attachment can be positioned in such a manner so that the blower pipe can be positioned vertically without requiring cumbersome spacing methods.

A further object of my invention is to provide an attachment which can be accommodated to silos of varying diameters.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the attachment as attached to a silo and to a silo blower pipe, FIGURE 2 is an enlarged sectional view taken generally along the lines 2—2 of FIGURE 1, FIGURE 3 is a side elevation of FIGURE 2, and FIGURE 4 is an enlarged detail.

My invention contemplates the provision of a special attachment for silo blower pipes wherein the pipe can be efficiently secured without requiring cumbersome attaching methods, and wherein the attachment can be effected in a very simple manner.

I have used the character 10 to designate the dome of a silo which has the filling opening 11, the character 12 indicating the cylindrical wall of the silo which is formed of several slats as shown, and I have further used the character 13 to indicate the upper circular band, there being several of such bands which are vertically spaced to secure the cylindrical silo wall. The character 14 indicates the pipe of the blower which is used to blow the silage into the silo, the pipe 14 extending into the portion 15, and the arcuate portion 16 having the opening at 17 to discharge the material into the silo.

The attachment of my invention includes a semi-circular band 18 which extends into a flange 19 through which passes a threaded stud 20 with which the nut 21 is engaged, the stud 20 being attached to a collar 22 which receives a bolt 23. The band 18 also is secured to a further collar 24 which receives a bolt 25.

The characters 26 and 27 indicate vertically spaced straps which include suitable openings through which the bolts 23 and 25 pass, and the character 28 indicates a block having the arcuate curvature at 29. Passing through the block 28 are the further bolts 30, the straps 26 and 27 also including the further openings 31, the block 28 including the extra openings 32. The straps 26 and 27 extend into the inwardly bent extremities 33 which are slightly bevelled at their ends 34.

The character 35 indicates bolts passing through the straps 26 and 27.

The arrangement is attached to the blower pipe 14 by loosening the various nuts 36 which are attached to the various bolts, and by thence placing the inwardly bent extremities 33 inwardly of the band 13 and thence tightening the various nuts 36, which will thereby cause the inner ends of the portions 33 to pass snugly behind the band where they will be also firmly secured against the silo wall 12.

The arcuate portion 29 of the block 28 will engage a substantial portion of the pipe 14, and the arcuate strap portion or band 18 which has first been removed from the stud 20 by removing the nut 21, is re-placed in the position shown in the various figures, and the nut 21 is re-tightened against the flange 19, the arrangement then securely holding the pipe 14 in vertical position.

It is usually desirable to position the pipe 14 in a true vertical position, and this can be readily accomplished by means of the extra openings 31 and the extra openings 32 and the openings through which the bolts 30 pass by merely changing the position of the block 28 through any of these openings, which will provide a variety of adjustable positions, which therefore provides means for vertically positioning the pipe without extra spacers, blocks, etc.

Also another important feature of the present device is that feature wherein the supporting straps 26 and 27 can be swung pivotally on the bolts 30 to accommodate different diameters of the bands 13 and still maintaining the proper radical effect to insure a firm grip by means of the extremities 33. In other words, when using larger bands 13 than that shown, by merely swinging the ends having the portions 33 further outwardly, such larger bands will be accommodated, only a very slight amount of pivotal movement being necessary.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A silo blower pipe attachment comprising a block, said block having a semi-circular configuration therein adapted to bear against a silo blower pipe, a pair of straps pivotally attached to opposed faces of said block and at one side thereof, a further pair of straps pivotally attached to said block faces at the other side thereof, integral inwardly bent flanges extending from said straps and adapted to be received against silo bands, an arcuate strap member adapted to engage outer portions of said blower pipe and attached to said straps.

2. A silo blower pipe attachment comprising a block, said block having a semi-circular configuration therein adapted to bear against a silo blower pipe, a pair of straps pivotally attached to opposed faces of said block and at one side thereof, a further pair of straps pivotally attached to said block faces at the other side thereof, integral inwardly bent flanges extending from said straps and adapted to be received against silo bands, an arcuate strap member adapted to engage outer portions of said blower pipe and attached to said straps, said straps and said block having extra openings to provide adjustable positioning of said pipe with respect to said silo.

References Cited in the file of this patent

UNITED STATES PATENTS

| | | |
|---|---|---|
| 2,603,394 | Beck | July 15, 1952 |
| 2,870,984 | Koser | Jan. 27, 1959 |